Patented Oct. 31, 1933

1,932,812

UNITED STATES PATENT OFFICE 1,932,812

GAS PURIFICATION

George M. Carvlin, Mount Lebanon Township, Allegheny County, Pa., assignor to The Koppers Company of Delaware, a corporation of Delaware No Drawing. Application February 12, 1931
Serial No. 515,415

4 Claims. (Cl. 23—225)

My invention relates to the purification of gas and especially to the purification of fuel gases such as coal gas, coke oven gas, water gas and the like from hydrogen sulphide and analogous impurities. My invention is more particularly related to a gas purification process in which a solution containing a compound of an element of the tin group of qualitative analysis, such as arsenic, is recirculated through an absorption stage and an actification stage.

Such processes are described in U. S. Patents No. 1,719,762 to H. A. Gollmar and No. 1,719,180 to D. L. Jacobson, and elsewhere. In these processes a solution containing a compound of an element of the tin group, preferably arsenic, is circulated over an absorption stage in which it absorbs $H_2S$ and other acidic constituents of the gas, such as HCN, and is thereby fouled. The fouled solution is then regenerated or actified by some suitable procedure, such as aeration, which liberates the sulphur removed from the gas in the absorption stage.

The sulphur liberated in the actification stage is in elemental form and separates from the solution as a froth, which is removed. The actified solution is then recirculated over the absorption stage to purify further quantities of gas.

The recirculated solution is kept in a non-acidic condition—that is, neutral or alkaline—by intermittent or continuous additions of a suitable alkaline material such as sodium carbonate (soda ash), lime, ammonia, or the like, to the system. These additions are made necessary by mechanical losses of solution and by conversion of the alkaline material to fixed salts which are not decomposed during actification.

The fixed salts in the purifying solution consist chiefly of thiosulphates and thiocyanates of the alkali employed. For example, when soda ash is used to maintain the desired hydrogen ion concentration in the solution, sodium thiosulphate and sodium thiocyanate are formed. These salts increase the specific gravity of the solution, thereby increasing pumping costs, and also decrease the efficiency of the process. To overcome these difficulties, it is general practice to discard portions of the solution from time to time.

The discarded solution is customarily replaced with water, which dilutes the main body of solution and reduces its concentration of salts, making it suitable for further use. However, this dilution also reduces the concentration of arsenic in the solution to an undesirable extent. The arsenic content should be from 0.5% to 1% as $As_2O_3$—for example, 0.75%—and when the concentration is reduced below this point by discarding part of the solution and diluting the remainder with water, more $As_2O_3$ or other suitable arsenic compound must be added. This adds appreciably to the cost of purification.

Another disadvantage of this procedure is that the discarded solution contains arsenic and is consequently difficult to dispose of in many localities where its discharge to water courses is prohibited. A similar difficulty is encountered when the sulphur recovered from the solution is washed to free it from adhering solution and salt. Such washing is usually a necessary step in the preparation of the sulphur for agricultural utilization and the like. The washing is effected with water which replaces the solution containing arsenic and salts from the sulphur, and both the replaced solution and the wash water must then be disposed of.

The withdrawal and discarding of purification solution either as such or from the recovered sulphur therefore results in the loss of arsenic compounds and other valuable salts as well as in the production of a waste which presents a difficult disposal problem.

An object of my present invention is to provide a method of overcoming these difficulties.

A second object of my invention is to provide an improved process of purifying fuel gas from $H_2S$ and analogous impurities by means of a recirculated solution containing an arsenic compound without wasting any of the arsenic.

Another object of my invention is to provide a process of recovering salts, especially sodium thiosulphate, from gas purifying solutions.

My invention has for further objects such other advantages and results as are found to obtain in the process hereinafter described and claimed.

By means of my present invention, I eliminate the necessity for discarding purification solution and/or sulphur wash water contaminated with arsenic. The arsenic ordinarily wasted is returned to the purifying system and I effect a further economy by recovering a valuable salt, such as sodium thiosulphate, from the ordinarily wasted spent solution.

In accomplishing these results I recirculate a solution containing an arsenic compound which absorbs $H_2S$ and analogous impurities from the gas over an absorbing stage and an actifying stage, as described hereinabove, and remove the sulphur liberated during actification. The actification may be accomplished by means of a flotation machine, a foraminous aerator, pressure thionizer, or other suitable means.

The specific gravity of the recirculated solution preferably does not exceed 1.20 to 1.25. I have found, for example, that satisfactory results are obtained with solutions having specific gravities as high as 1.22, corresponding to a total salt content of approximately 340 grams per liter. Solution with a specific gravity of 1.20 contains approximately 300 grams per liter of total salts.

To keep the specific gravity of the solution from exceeding this limit, portions of the solution are withdrawn from time to time, either directly or with the recovered sulphur. This solution is then evaporated to a concentration at which a major portion of its sodium thiosulphate content is insoluble at temperatures in the neighborhood of 0° C. Under ordinary conditions such a concentration is reached when the withdrawn solution is evaporated to about half its original volume—for example, 45% of its original volume. The concentrated solution is then cooled, preferably to about 0° C., to crystallize sodium thiosulphate.

This concentration and cooling causes the major portion of the sodium thiosulphate to crystallize out of the solution substantially without crystallization of any of the arsenic compound therefrom. The remaining concentrated solution, which may now amount to only about 26% of its original volume, for example, but which still contains substantially all the arsenic originally present therein, is then readily separated from the thiosulphate crystals, as by filtration, and returned to the gas-purifying system. The main body of solution is made up to the desired volume by adding fresh water or sulphur wash water, and is suitable for further use without addition of a further quantity of $As_2O_3$ or other arsenic compound.

This process is adapted to the treatment of any kind of fuel gas but is especially suited to the treatment of gases substantially free from HCN, such as water gas. This condition is assured in a process such as that described in a co-pending application of H. A. Gollmar, Serial No. 585,446, filed January 8, 1932, in which the gas is treated to remove HCN prior to the absorption of $H_2S$ in arsenical solutions. In said Gollmar process gas containing both hydrogen sulphide and hydrogen cyanide is initially treated with a liquid having selectively absorbent properties with respect to hydrogen cyanide, for example, an aqueous and preferably alkaline suspension of sulphur or an alkaline suspension of a ferrous precipitate or any other absorbent liquid. Subsequently the gas is treated for the removal of the hydrogen sulphide by means of the thio-arsenic process described in Gollmar Patent 1,719,762. All the sodium thiocyanate produced is confined to the liquid used in the initial or preliminary stage, while the sodium thiosulphate is formed in the liquid in the subsequent stage due to the inherent separation of the two stages. When gases substantially free from HCN are purified, substantially all the fixed salt in the solution is thiosulphate. This is crystallized and separated from the solution as described, making it unnecessary to discard solution at any time. However, when gas containing HCN is treated, the amount of solution to be discarded is very materially reduced by my present invention.

While my invention has been described with special reference to the separation of sodium thiosulphate from gas purifying solutions containing arsenic compounds, it is also applicable to the separation of other thiosulphates from such solutions and to the separation of sodium thiosulphate and other thiosulphates from solutions containing compounds of other elements of the tin group of qualitative analysis, such as antimony and tin.

It will be obvious to those skilled in the art that various modifications can be made in the several parts of my process without departing from the spirit of my invention, and it is my intention to cover in the claims such modifications as are included within the scope thereof.

I claim as my invention:

1. In a process of purifying gas from acidic constituents which comprises recirculating a solution containing a sodium compound and an arsenic compound over a stage in which the solution absorbs acidic constituents from the gas and is thereby fouled and over a stage in which the fouled solution is aerated and sulphur is liberated, thereby forming sodium thiosulphate and sodium thiocyanate, the improvement comprising, keeping the content of the recirculated solution between 300 and 400 grams per liter of sodium thiosulphate and sodium thiocyanate by withdrawing solution from the recirculated solution, concentrating the withdrawn solution to approximately 45% of its original volume, cooling the concentrated solution to approximately 0° C., and thereby crystallizing sodium thiosulphate substantially without crystallizing other constituents of the solution and returning the remaining solution to the recirculated solution.

2. In a process of purifying gas from acidic constituents which comprises recirculating a solution containing a sodium compound and an arsenic compound over a stage in which the solution absorbs acidic constituents from the gas and is thereby fouled and over a stage in which the fouled solution is aerated and sulphur is liberated, thereby forming sodium thiosulphate in the recirculated solution, the improvement which comprises withdrawing part of the solution from the purifying system, concentrating the solution so withdrawn to about half its original volume, cooling the concentrated solution to about 0° C. to crystallize thiosulphate substantially without crystallizing the arsenic compound, separating crystallized thiosulphate from the remaining solution, and returning the remaining solution to the purifying system.

3. In a process of purifying gas from acidic constituents which comprises recirculating a solution containing a sodium compound and an arsenic compound over a stage in which the solution absorbs acidic constituents from the gas and is thereby fouled and over a stage in which the fouled solution is aerated and sulphur is liberated, thereby forming sodium thiosulphate in the recirculated solution, the improvement comprising keeping the sodium thiosulphate content of the solution between 300 and 400 grams per liter by withdrawing solution from the recirculatory system, concentrating the withdrawn solution to about half its original volume, cooling the concentrated solution to about 0° C. to crystallize sodium thiosulphate, separating crystallized sodium thiosulphate from the remaining solution, and returning the remaining solution to the recirculatory system.

4. In a process of purifying a gas from hydrogen sulphide which comprises recirculating a non-acidic solution containing a sodium compound and an arsenic compound over a stage in which the solution absorbs hydrogen sulphide from the gas and is thereby fouled and over a stage in which the fouled solution is aerated and sulphur is liberated, thereby forming sodium thiosulphate in the recirculated solution, the improvement comprising keeping the sodium thiosulphate content of the solution between 300 and 400 grams per liter while keeping the arsenic content between 0.5% and 1% as $As_2O_3$ by withdrawing solution from the recirculatory system, concentrating the withdrawn solution to about one-half its original volume, cooling the concentrated solution to about 0° C. to crystallize sodium thiosulphate substantially without crystallizing the arsenic compound, separating crystallized sodium thiosulphate from the remaining arsenic-containing solution, and returning this solution to the recirculatory system.

GEORGE M. CARVLIN.